United States Patent

[11] 3,610,684

[72] Inventor Dudley Cole Richter
 231 Shore Drive East, Miami, Fla. 33133
[21] Appl. No. 835,688
[22] Filed June 23, 1969
[45] Patented Oct. 5, 1971

[54] PROTECTIVE COVER
 9 Claims, 3 Drawing Figs.
[52] U.S. Cl. ................................................. 296/152,
 206/7, 267/139, 293/1
[51] Int. Cl. .................................................. B60j 11/00
[50] Field of Search ........................................ 296/152;
 293/1, 62, 54 D, 71; 206/7 H, 7 K, 7 M; 267/139

[56] References Cited
UNITED STATES PATENTS
1,486,566 3/1924 Crecelius ...................... 296/152
3,295,644 1/1967 Furuya .......................... 206/7 H

*Primary Examiner*—Philip Goodman
*Attorney*—John Cyril Malloy

ABSTRACT: A protective cover to overlay the surface of an automobile which includes, in combination, a planar pad of flexible cushiony material, such as a small piece of carpet, and hook means to engage the handle of an automobile with the hook means being secured to the carpet pad so that the carpet pad, when hooked to the door handle of a vehicle, to overlay the door area so that when the car is parked in a parking lot and the pad is in position, opening of the door of an adjacent car will not dent or mark the finish of the car with the pad.

PATENTED OCT 5 1971
3,610,684
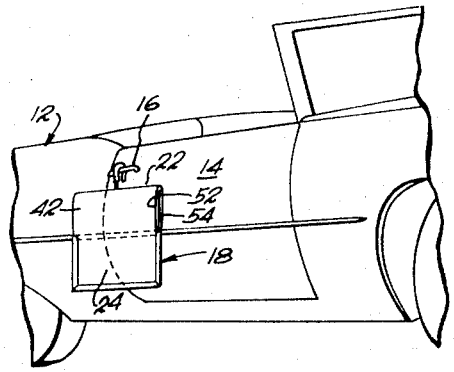
Fig. 1
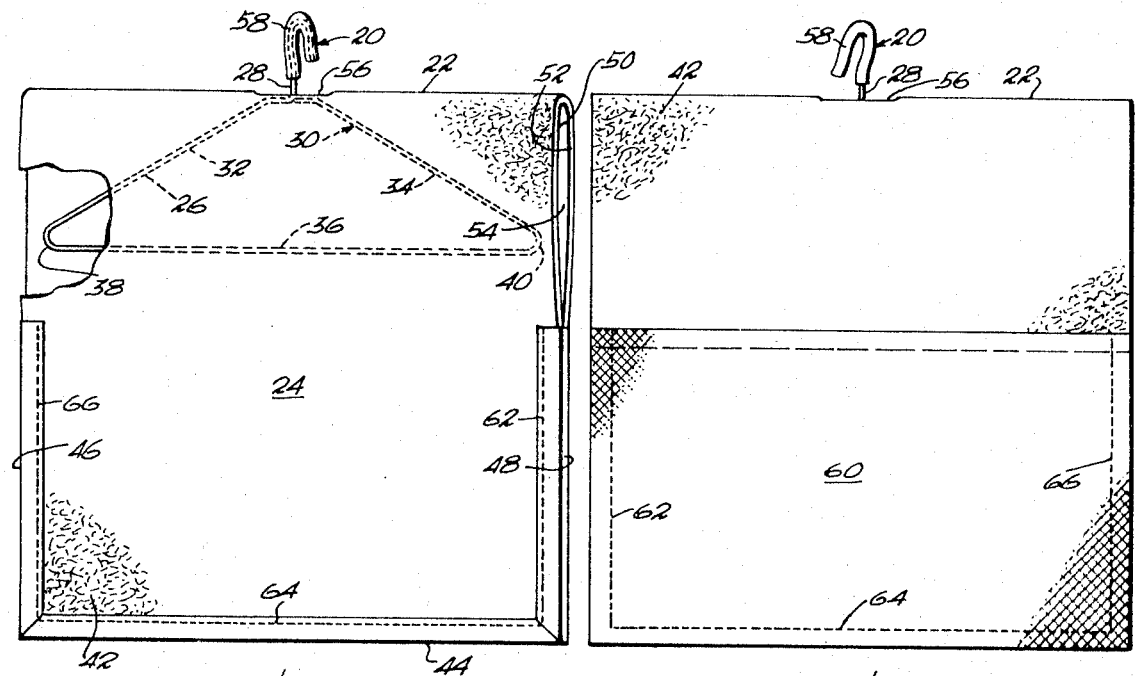
Fig. 2
Fig. 3
INVENTOR.
DUDLEY COLE RICHTER
BY John Cyril Malloy
ATTORNEY.

PROTECTIVE COVER

In the past, it is well known that vehicles are often damaged in a parking lot. Often this occurs in the door area. Often times the automobiles are parked in a parking lot in close adjacent side-by-side relation and to conserve space there is very little room between the parking places. Under these circumstances when the door of one vehicle is open, and a driver attempts to seat himself in the cab, the door of the vehicle which he is entering bangs against or forcibly presses against the side of the next adjacent vehicle.

This invention has as an object the provision of a protective pad to hang in overlaying relation of the side of a vehicle extending downwardly from the handle on the door.

It is another object of this invention to provide a protective pad of an area at least about 1 square foot which is of substantially thick cushiony material, such as carpet material and hook means carried along one edge of the pad to engage the handle of a vehicle door, especially for use on the passenger side of a vehicle so that when the pad is in position, opening and closing of a door on the driver side of a vehicle next adjacent to it will not hit the surface of the automobile but, rather, the surface of the pad.

It is an object of this invention to provide an inexpensive, easily assembled pad composed of materials which are often discarded and which can be sold especially by civil organizations and manufactured by blind persons to promote industry by such groups and to provide a protective cover for a vehicle.

In accordance with these and other objects which will become apparent hereinafter the instant invention will now be described with reference to the accompanying drawings in which:

FIG. 1 is a partial view of the passenger side of a vehicle with the protective cover in position on the door handle;

FIG. 2 is a view of the protective pad or cover which has been partly broken away to illustrate the details of the construction thereof;

FIG. 3 is an elevation view of the protective cover of FIG. 2.

Referring to the drawings wherein like-referenced characters designate like or corresponding parts throughout the several views, there is shown a vehicle 12 having a passenger side door 14 provided with a handle 16 from which the protective cover 18 depends.

Referring to FIG. 2 it is seen that a hook means 20 is provided along the upper edge 22 of the pad body 24, which hook is adapted to engage the handle 16 of a vehicle door. In a preferred embodiment the hook means may comprise a simple wire coathanger such as that designated by the numeral 26 protectively held away from the surface of the vehicle when the protective cover is in position. In the embodiment shown the hanger includes a shank portion 28, and lateral extending means 30 comprising two downwardly diverging legs 32 and 34 which are joined by a rigidifying lateral member 36 spanning the lower terminal ends 38 and 40 of these legs. The protective pad is of cushiony material, such as a discarded section of rug or carpet material indicated by the numeral 42. Preferably the pad is of an area of at least about 1 square foot and having height between the upper edge 22 and the lower edge 44 of about at least 1 foot and a distance between the side edges 46 and 48 being of at least about the same dimension so as to provide a planar area sufficient to overlay the area which is the widest thickness of a vehicle at about the vehicle door, as is seen in FIG. 1. The thickness of the material is preferably at least about one-eighth and preferably one-quarter of an inch thick so as to provide a substantial cushioning depth. The cushioning material may be formed with a double thickness at the upper edge thereof to provide a double thickness indicated by the numerals 50 and 52 and substantially one-half the height of the protective cover extending from the upper edge 22 and providing a chamber 54 therebetween within which the hanger means is captivated, the upper edge 22 having a mouth 56 through which the hook means extends and the double thickness of the chamber wall and the upper edge 22 in combination with the opening of the mouth providing together with the lateral dimension of the structure of the hanger means, a means to secure the hook means to the pad. As seen in the drawings, in the preferred embodiment, the bite of the hook is turned so that it lies in a plane which is at an angle with respect to the main plane of the pad. It is seen that the shank 28 of the hook is twisted about its vertical length in order to achieve this orientation in the preferred embodiment. Finally, the bite of the hook is provided with a protective overlaying layer 58 which may be in sleeve form and formed of tough flexible plastic material in tubular form jacketing the hook end. The pad may also include a continuation 60 of the portion of the thickness 52 to carry it to the lower edge 44, the continuation being either an additional length of the carpet or, as shown in the drawings, comprising a layer of seam material. Stitch means or seam means 62, 64 and 66 are provided to secure the continuation to the main pad of cushiony material and to finish the edges providing a tough, wear-resistant outer edge therearound. Also, the interior space between the continuation 60 and the pad constitutes a pocket which may at the option of the user include a replaceable insert of cushiony material. In this manner the cushiony material of the pad may be composed of an outer confining layer of flexible material and cushiony material captivated within the pocket as the liner or, alternatively, a single layer of cushiony material which is reinforced at the option of the user, additional cushiony material received within the chamber 54 and also in the pocket between the continuation 60 and the pad. In use, the pad may be provided to users of a parking lot at a small additional fee to provide increased protection to the passenger side of their vehicle which is often damaged by the attendant in a parking lot. The pads may be quickly, cheaply and inexpensively assembled from materials which are ordinarily discarded at an assembly point by inexperienced or handicapped workers. In this manner the protective pad may be distributed by civil organizations and an income provided for such inexperienced or handicapped persons and a service provided for the community.

What is claimed is:

1. A protective cover adapted for pendant support on the outside handle of an automobile door to overlay the door outside surface of the automobile, in combination, pad means including a planar pad body of an area of at least about 1 square foot and of a height between the upper and lower edges and between the opposite side edges of at least about 1 foot, said pad comprising a construction of cushiony fabric material of a thickness of at least about one-quarter inch; and hook means secured to said planar body for pendantly supporting said pad means including a wire hook portion terminating in a downwardly oriented hooked end, said hook portion extending from the central region of the upper edge of said pad a distance of at least about 2 inches, said hooked end being adapted to be loosely hooked over the handle of the door of an automobile, with said planar body disposed flatwise over the outside door surface of the automobile.

2. The protective cover as set forth in claim 1 wherein said hook means includes a shank portion and a bite portion with the plane of the bite portion of said hook means being normally arranged at an angle intersecting the main plane of said pad body, whereby the pad body is oriented with an outside surface on the side away from the bite portion.

3. The protective cover as set forth in claim 1 wherein said pad body comprises a patch of carpet material.

4. The protective cover as set forth in claim 1 wherein said hook means comprises a coathanger having diverging leg portions and a protective tubular means coaxially fitted over the hook portion of said coathanger.

5. The protective cover as set forth in claim 4 wherein said pad body is of double wall thickness defining a pocket and including a folded upper edge with an opening formed in the central region of said upper edge, and with the leg portions of said coathanger being constrained in said pocket with the hook portion projecting through the opening in said folded upper edge.

6. The protective cover as set forth in claim 5 wherein peripheral seam means are provided in said opposite side edges and said lower edge of said pad body securing the double wall thicknesses together, defining said pocket therein.

7. A protective cover device to be pendantly supported on the outside handle of an automobile door for protecting the door outer surface, comprising pad means formed substantially entirely of thick heavy fabric material, said pad means including a generally rectangular body, vertically arranged and having a double thickness upper portion defining an upper pocket defined in part by an upper edge margin connecting the opposite thicknesses of material of the pocket, and with the upper edge margin having an opening communicating with the interior of the upper pocket; and, hanger means for supporting said pad means from the door handle of the automobile, said hanger means being of ordinary wire coathanger configuration having a generally triangular lower portion, a hook portion, and a shank portion connecting the triangular lower portion and hook portion; the triangular portion of said hanger means being constrained in said upper pocket of said pad body with said hook portion projecting through said opening, said hook portion being adapted to be loosely hooked over the automobile door handle for pendantly supporting the pad body over the exterior surface of the automobile door.

8. A protective cover device as set forth in claim 7 wherein said pad body includes a lower portion of double thickness form defining a lower pocket adapted to receive cushioning material.

9. A protective cover device as set forth in claim 8 wherein the lower pocket of said pad body opens upwardly and includes thread seam means securing together the double fabric thicknesses along respectively opposite side edge margins and the lower edge margin of the pad body.